United States Patent
Schaedel

(10) Patent No.: US 7,337,980 B2
(45) Date of Patent: Mar. 4, 2008

(54) METHOD OF TRANSFERRING FROM A PLANT FOR THE PRODUCTION OF PACKAGING MATERIAL TO A FILLING MACHINE, A METHOD OF PROVIDING A PACKAGING MATERIAL WITH INFORMATION, AS WELL AS PACKAGING MATERIAL AND THE USE THEREOF

(75) Inventor: Bertil Schaedel, Lund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 175 days.

(21) Appl. No.: 10/532,591

(22) PCT Filed: Oct. 3, 2003

(86) PCT No.: PCT/SE03/01541

§ 371 (c)(1),
(2), (4) Date: Apr. 25, 2005

(87) PCT Pub. No.: WO2004/045953

PCT Pub. Date: Jun. 3, 2004

(65) Prior Publication Data

US 2006/0032928 A1 Feb. 16, 2006

(30) Foreign Application Priority Data

Nov. 19, 2002 (SE) .................................... 0203411

(51) Int. Cl.
*G06K 19/06* (2006.01)

(52) U.S. Cl. .................... 235/494; 235/475; 53/462

(58) Field of Classification Search .................. 53/462; 235/494, 475
See application file for complete search history.

(56) References Cited

U.S. PATENT DOCUMENTS

| 4,698,514 | A | | 10/1987 | Hilmersson et al. |
| 5,727,367 | A | * | 3/1998 | Cahill et al. .................. 53/462 |
| 6,021,950 | A | | 2/2000 | Hilmersson |
| 6,107,920 | A | | 8/2000 | Eberhardt et al. |

(Continued)

FOREIGN PATENT DOCUMENTS

DE 31 24 344 A1 1/1983

(Continued)

OTHER PUBLICATIONS

International Search Report.

*Primary Examiner*—Seung Ho Lee
(74) *Attorney, Agent, or Firm*—Buchanan, Ingersoll & Rooney PC

(57) ABSTRACT

A method of transferring information from a plant for the production of packaging material to a filling machine involves producing a web of the packaging material, measuring, on the production of the web, a predetermined magnitude in a first portion of the web, with the portion being intended to form a first package in a filling machine, providing, on the production of the web, a second portion which is intended to form a second package in a filling machine, with information as to the measured magnitude, reading-off the information in a filling machine and controlling a second predetermined magnitude in the filling machine on the basis of the information.

11 Claims, 3 Drawing Sheets

Figure 1:
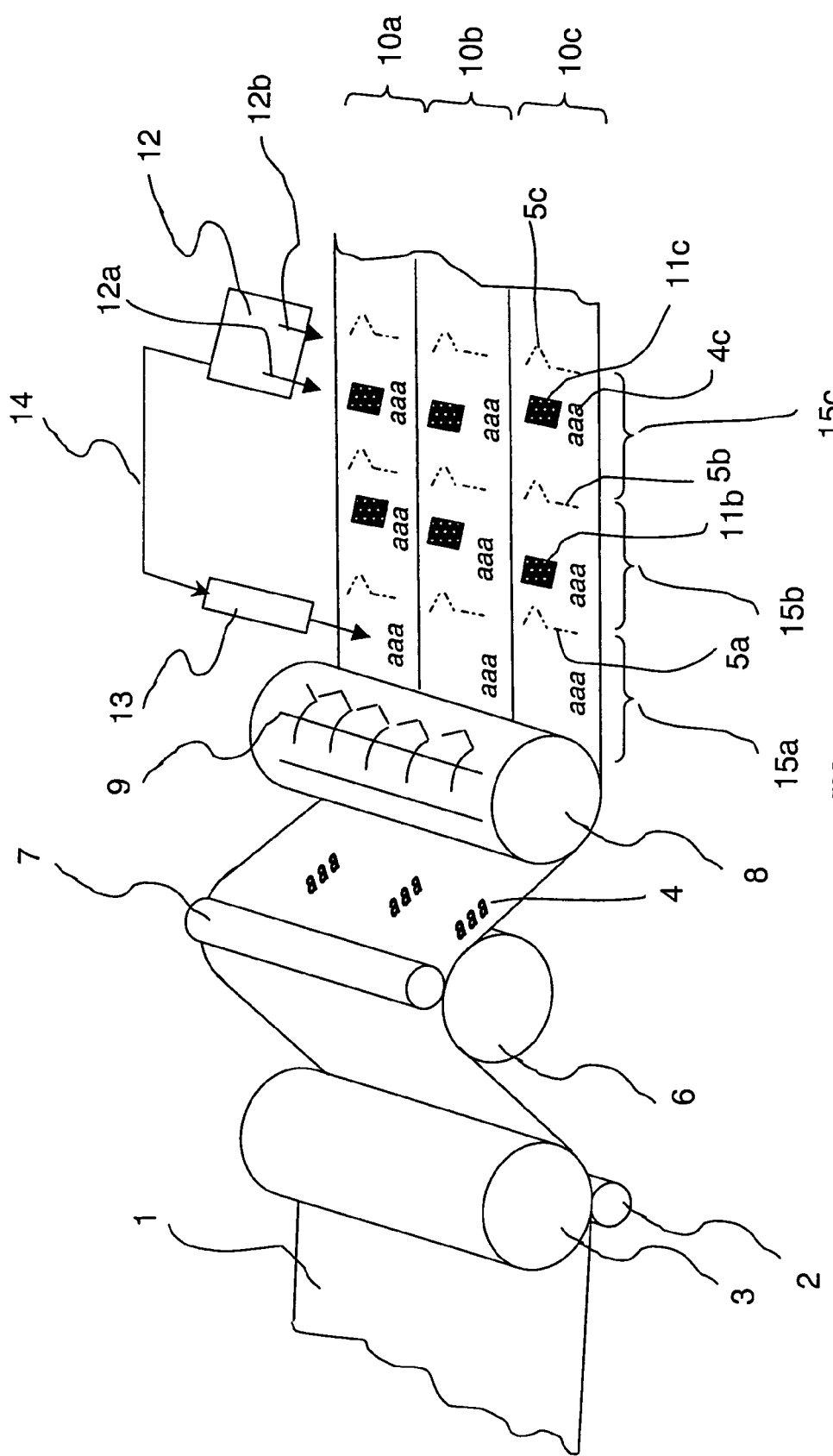

U.S. PATENT DOCUMENTS 7,188,774 B2 * 3/2007 Pinchen et al. ............. 235/487

FOREIGN PATENT DOCUMENTS

| | | |
|---|---|---|
| DE | 20 107 366 U1 | 9/2001 |
| EP | 0 013 968 A1 | 8/1980 |
| EP | 0 131 241 A2 | 1/1985 |
| EP | 0 705 759 A1 | 4/1996 |
| EP | 0 761 546 A1 | 3/1997 |
| EP | 0 292 474 B1 | 7/1999 |
| GB | 2 186 226 A | 8/1987 |
| WO | WO 95/00393 A1 | 5/1995 |
| WO | WO 96/41296 A1 | 12/1996 |
| WO | WO 00/16289 A1 | 3/2000 |
| WO | WO 00/41148 A1 | 7/2000 |
| WO | 01/48591 A1 | 7/2001 |
| WO | WO 01/48591 A1 | 7/2001 |
| WO | 01/60730 A2 | 8/2001 |
| WO | WO 01/79988 A1 | 10/2001 |
| WO | WO 01/80146 A1 | 10/2001 |

* cited by examiner

METHOD OF TRANSFERRING FROM A PLANT FOR THE PRODUCTION OF PACKAGING MATERIAL TO A FILLING MACHINE, A METHOD OF PROVIDING A PACKAGING MATERIAL WITH INFORMATION, AS WELL AS PACKAGING MATERIAL AND THE USE THEREOF

TECHNICAL FIELD

The present invention relates to a packaging material according to the preamble to appended claim 1, as well as to use of a specific pattern in accordance with appended claim 7. The present invention further relates to a method of transferring information from a plant for the production of packaging material to a filling machine in accordance with appended claim 9, as well as a method of providing a packaging material with information from a plant for the production of packaging material in accordance with appended claim 10. Finally, the present invention relates to a web-shaped packaging material in accordance with the preamble to appended claim 14.

BACKGROUND ART

Today, a large proportion of juice and milk is packed in packages which consist of paper-based packaging laminate. The commonest types of packages are brick-shaped packages which, int. al. are sold by Tetra Pak under the registered trade mark Tetra Brik®, and so-called gable top packages which, int. al., are sold by Tetra Pak under the trade mark Tetra Rex®.

The packaging industry is essentially constructed so that machine and material suppliers deliver filling machines and ready-printed packaging laminate to dairies which, in their plants, treat and finish the beverages and thereafter fill them into packages with the aid of the filling machine. The dairy then sells the packed beverages direct or through wholesale outlets to retailers. Finally, the consumers purchase the beverages from the retail outlets.

In this value chain, there are numerous interested parties who have long attempted to transfer information from one link to another in order to increase productivity, quality, customer service etc.

Today, for example information is transferred from the printing of the packaging laminate to the filling machine. In the printing, a guide mark in the form of a bar code or the like is printed which is employed to activate and control the filling machine. This guide mark is normally printed on the packaging laminate so that there is a guide mark on each finished package. For example, the guide mark may be employed for controlling the advancement of the filling machine so that any possible holes which are needed are punched in the correct position, so that any possible opening arrangements are placed in the correct position and so that the package is folded at the correct place. Such a guide mark and a method of reading and using the information from the guide mark are described in EP 131241 B1 and U.S. Pat. No. 6,021,950.

The latter example of ensuring that the package is folded at the correct place is one example of the transfer of information from the conversion process to the filling machine. The guide mark is printed on the laminate at a given position in relation to the crease line pattern which is also formed on the laminate in the conversion process. The filling machine can, by means of, for example, photocells, detect the guide mark and, by correctly adjusting the filling machine, it is possible to ensure that the filling machine always folds the packaging laminate into packages along the prepared folding lines in the crease pattern. This process requires that the guide mark is always placed within certain tolerances in relation to the crease line pattern. Further, it is required that the folding which the filling machine carries out take place within certain tolerances in relation to that position on the packaging laminate where the filling machine identified the guide mark.

WO 01/80146, WO 01/79988, U.S. Pat. No. 6,107,920, WO 96/41296, WO 00/16289 and WO 00/41148 all describe another type of technology for information transfer. With the aid of a so-called RFID label (radio frequency identification) it is disclosed that it is possible to trace and guide paper products within the printing industry, and also that it is possible to transfer information on trade marks, brand names, manufacturers, product numbers, quantity per package, etc. However, there is a number of factors that have hitherto restricted the employment of these RFID labels. First, it is a technical solution which, employing state of the art technology, is relatively expensive and, as a result, is difficult to make economically viable. Further, it has proved that there may be difficulties with this technology if the packages contain metals. Today, most so-called aseptic packages (which may be distributed without refrigeration) include a thin layer of aluminium foil which would have a disruptive effect on the use of RFID labels.

EP 929474 describes a packaging material which is provided with a crease line pattern for forming packages which are provided with invisible information. By employing invisible information in the form of printing ink which is visible in infra-red or ultraviolet light, the surface area of the package which may be provided with visible decorative artwork is not reduced. Information which may be supplied to the package by such means is, for example, control figures, shipment numbers, guide marks for controlling transverse sealing and subsequent folding of the package.

WO 95/00393 describes a packaging laminate with a magnetisable surface which is intended to store information relating to the packaging laminate, the information being intended for controlling the filling machine in connection with filling, sealing and folding of the packages.

WO 01/48591A1 describes a relatively recently developed technology according to which a specific pattern is created which is printed on a notepad and is read off by a camera disposed on a pen. This publication describes that this specific pattern may be varied to such an extent that the imaginary surface which, throughout its entire extent, has a unique pattern, has a size of 4,600,000 square kilometres, in order words a surface which is approximately half the size of Europe. Parts of this imaginary surface are printed on paper and linked either to a unique function, such as sending an e-mail, or to pure text recognition for entering text into a computer or other electronic equipment. For example, it is possible to print notepads adapted for writing fax messages or e-mails. The notepad is then designed so that each page has a part where the text is to be written, a part where the e-mail address is to be written and a symbol which gives the signal that the e-mail message is to be transmitted. The information which is read-off by the pen is sent, for example, via the mobile telephone network to a server which reads off the site of the imaginary surface and then executes the function which corresponds to this specific site. In order for this technology to function in the manner intended, it is thus necessary that the specifically created substrate is adapted for the application which the user intends to employ.

The technologies described above are, to some extent, associated with operational problems depending upon various factors such as the price level of the technology, disruptive metal layers in the laminate, etc. Further, a part of the technology is greatly restricted to certain sections of the above-described value chain. For example, it is difficult to utilise RFID labels for information transfer to end consumers. The shop shelf is the last interested party which in all reasonableness is provided with equipment capable of reading the RFID label, i.e. information to the consumer can be displayed in the shop or be sent together with goods as a paper copy. Thus, there is a need for further alternative solutions. It is moreover desirable that this technology be capable of being used as an information vehicle in the contact with various different interested parties in the value chain.

SUMMARY OF THE INVENTION

One object of the present invention is to realise an alternative solution to how to be able to transfer information via the packaging laminate.

A further object of the present invention is to realise a solution to how to be able to transfer control information to a filling machine via the packaging laminate.

Yet a further object of the present invention is to realise a solution to how to be able to transfer information to and from different interested parties, such as a conversion process (lamination, creasing and printing), a filling machine and a dairy owner, a wholesaler, a retailer and an end consumer.

The above-outlined objects have been attained by means of a packaging material of the type disclosed by way of introduction which has been given the characterising features as are apparent from appended claim 1.

By causing the packaging material to carry a quantity of information which comprises a pattern of dots in which a number of the dots are offset in relation to a symmetrically repetitive nominal dot position, it is possible to print information which may be employed, on the one hand, to transmit a direct message to a filling machine or the like, on the other hand, to convey a service via a mobile telephone network or the like. Alternatively, the dots may contain a subinformation quantity in that they have different configurations, sizes or if they are present at all in the expected nominal position and/or the offset position in relation to the nominal position. The term configuration is here taken to signify various geometric shapes, sizes within the same shape, and total absence or not.

In the conveying of the direct message from the packaging material to the filling machine, use is made of the dot pattern according to one preferred embodiment in a manner which may most closely be likened to Braille. However, the dot pattern which constitutes the information can comprise a considerably greater number of dots which in turn means that a single area with information can contain much more information than, for example, Braille.

In the transfer of information via a mobile telephone network or the like, it is possible to transfer variable information from the packaging material to a filling machine, or to other interested parties in the value chain, such as wholesalers, retailers, consumers. In this utilisation of the system, it is conceivable also to be able to transfer information backwards in the value chain in that, for example, the consumer employs a pen provided with a camera and marks out a selected part of the package in order to activate a specific service. This service might be the placing of an order for a recipe, further information material or other services. The printed matter on the packaging laminate can be determined by the dairy owner, with the result that the dairy owner can himself link selected services to selected packages, to a certain product type or for a given period of time.

This packaging material with this type of information offers technical solutions to different objects and fields of application which have previously been restricted by different factors which, above all, have been difficult to implement also in the consumer stage as well.

Preferred embodiments of the present invention are further apparent from the appended subclaims.

Advantageously, dots have been formed displaying a colour within a wavelength area which differs from the colours from which the decorative pattern of the package is printed. By such means, the dots may be observed by a wavelength-defined sensor without the pattern (the design printed artwork) selected by the dairy owner disrupting the read-off of the dot pattern. This thus entails that it is possible to employ the complete surface of the package for transferring information in the form of dot patterns at the same as it is possible to utilise the entire surface of the package for printing a pattern of decorative artwork intended to appeal to the consumers.

According to one preferred embodiment, the above mentioned dots have at least two different sizes for representation of a zero and a one, respectively, in a binary information quantity, which renders the technology particularly well adapted for transferring information reliably within the electronic world which is largely built up according to binary mathematics.

According to another preferred embodiment, the above mentioned dots represent a guide mark for controlling a filling machine. By employing this information for controlling a filling machine, it is possible to transfer information from the manufacturing process regarding material specifications, deviations from the specification, measured magnitudes regarding the position of different crease lines and printing in relation to the guide mark, etc. The guide mark may in itself also contain a more traditional starting signal which has previously been represented by a bar code or the like.

Advantageously, the above mentioned dots represent a measured magnitude in respect of the positioning of a guide mark in relation to a crease line pattern and/or to its nominal position in relation to the crease line pattern. By such means, it is possible to control the filling machine or other processing equipment so as to form the packages in accordance with the actual position of the crease line pattern.

Preferably, the above mentioned dots represent a measured magnitude in respect of the positioning of a guide mark in relation to a design printed artwork on the packaging material and/or to its nominal position in relation to the design printed artwork. By such means, it is possible to control the filling machine or other processing equipment to form the packages in accordance with the actual position of the design printed artwork.

The above objects have also been retained by the employment of a dot pattern in which a number of the dots are offset in relation to a symmetrically repeating nominal dot position, on a packaging material for information storage. By employing the above-defined dot pattern on a packaging material, it is possible to transfer permanent information direct to a filling machine or the like, at the same time as it is possible, using the same technology, to transfer permanent or variable information to a consumer or to the above mentioned filling machine.

The above mentioned objects have also been attained by a method of transferring information from a plant for producing packaging material to a filling machine, comprising the steps of: a) producing a web of packaging material, b) measuring, in the production of the web, a predetermined magnitude of a first portion of the web, this portion being intended to form a first package in a filling machine, c) providing, in the production of the web, a second portion which is intended to form a second package in a filling machine, with information about the above mentioned measured magnitude, d) reading-off said information in a filling machine, and e) controlling a second predetermined magnitude in the filling machine on the basis of said information, as well as a method of providing a packaging material with information from a plant for the production of packaging material, comprising the steps of: a) producing a web of packaging material, b) measuring, in the production of the web, a predetermined magnitude of a first portion of the web, the portion being intended to form a first package, c) providing, in the production of the web, a second portion which is intended to form a second package, with information on said measured magnitude.

By designing the process in this manner, it is possible, in a simple manner in a single station and on a single occasion, to print a guide mark which contains information about material specifications, deviations, etc., and which moreover contains information about the guide mark itself, such as actual positioning in relation to crease line patterns, design printed artwork or the like. A converter plant in industrial operation which is intended to laminate together paper, plastic and possibly aluminium, to print design printed artwork and to provide material with a crease line pattern, is relatively stable because of its inherent inertia. This implies that the process will be varied at a slow rate back and forth between different minor deviations from the nominal (desired) state. Thus, for example the positioning of a crease line in relation to a guide mark will not vary to any appreciable extent between two portions of the packaging material located proximal to one another. By measuring, for example, the positioning of a guide mark in relation to a crease line on a first portion of the web-shaped packaging material and thereafter, simultaneously with the printing of subsequent guide marks on a second portion of the packaging material, moreover insert information about said measurement information will be entered which is as good as totally correct for the second guide mark per se. If, for example, the filling machine is then adjusted in accordance with this information in respect of deviation, it is possible to modify the tolerance picture for the entire process. Since printing and conversion process possess an inherent inertia, it is possible to permit broader tolerances for these processes, since it is possible to transfer information about the deviation to subsequent processing stations, such as the filling machine. The property utilised is that even if the tolerances are made broader, it will still be known that the process does not leapfrog back and forth between extremities, but that the process varies a little at a time.

The above-outlined objects according to the present invention have also been attained by means of a web-shaped packaging material which comprises, along its longitudinal direction, a substantially repetitive pattern of portions located after one another in the longitudinal direction and each one of which being intended to be formed into a package, the material having been given the characterising features that a first of said portions is provided with information relating to a measured magnitude of a second portion separate and discrete from the first of said portions. As was mentioned above, the advantage will, by such means, be utilised in the inertia of the printing and lamination processes so that it is possible to render the tolerances of these processes broader at the same time as giving each respective portion of the packaging material information relevant to each respective portion per se, at the same time as it is possible to carry out the printing of the guide mark and the information concerning the guide mark in the same step at the same time.

According to one preferred embodiment, the first and second portions follow immediately after one another along the web. By such means, the difference between the magnitude measured in the first portion and printed on the second portion and that magnitude which is measured in the second portion in order to be printed on a subsequent portion.

According to another preferred embodiment, the first and second portions are separated from one another by means of a number of portions which are each one intended to be formed into packages. By such means, it is possible to employ simpler equipment since it is not necessary to have time to transfer and print information regarding a first portion on the immediately subsequent portion.

Advantageously, said information comprises a pattern of dots in which a number of the dots are offset in relation to a symmetrically repeating nominal dot position. This method of transferring information is well suited for rapid printing, since it is possible to employ different types of micro-inkjet nozzles which are rapidly manoeuvrable. Further, the technology may be employed for transferring information direct through the pattern and moreover for transferring variable information via mobile telephone services or the like.

In order to be able to make possible maximum utilisation of the surfaces of the packages, said dots have a colour within a wavelength range which differs from those colours from which the decorative artwork pattern of the package are printed. By such means, the dots may be observed by a wavelength-defined sensor, i.e. it is possible to superimpose the design printed artwork selected by the dairy owner on the dot pattern.

BRIEF DESCRIPTION OF THE
ACCOMPANYING DRAWINGS

Figure 2:
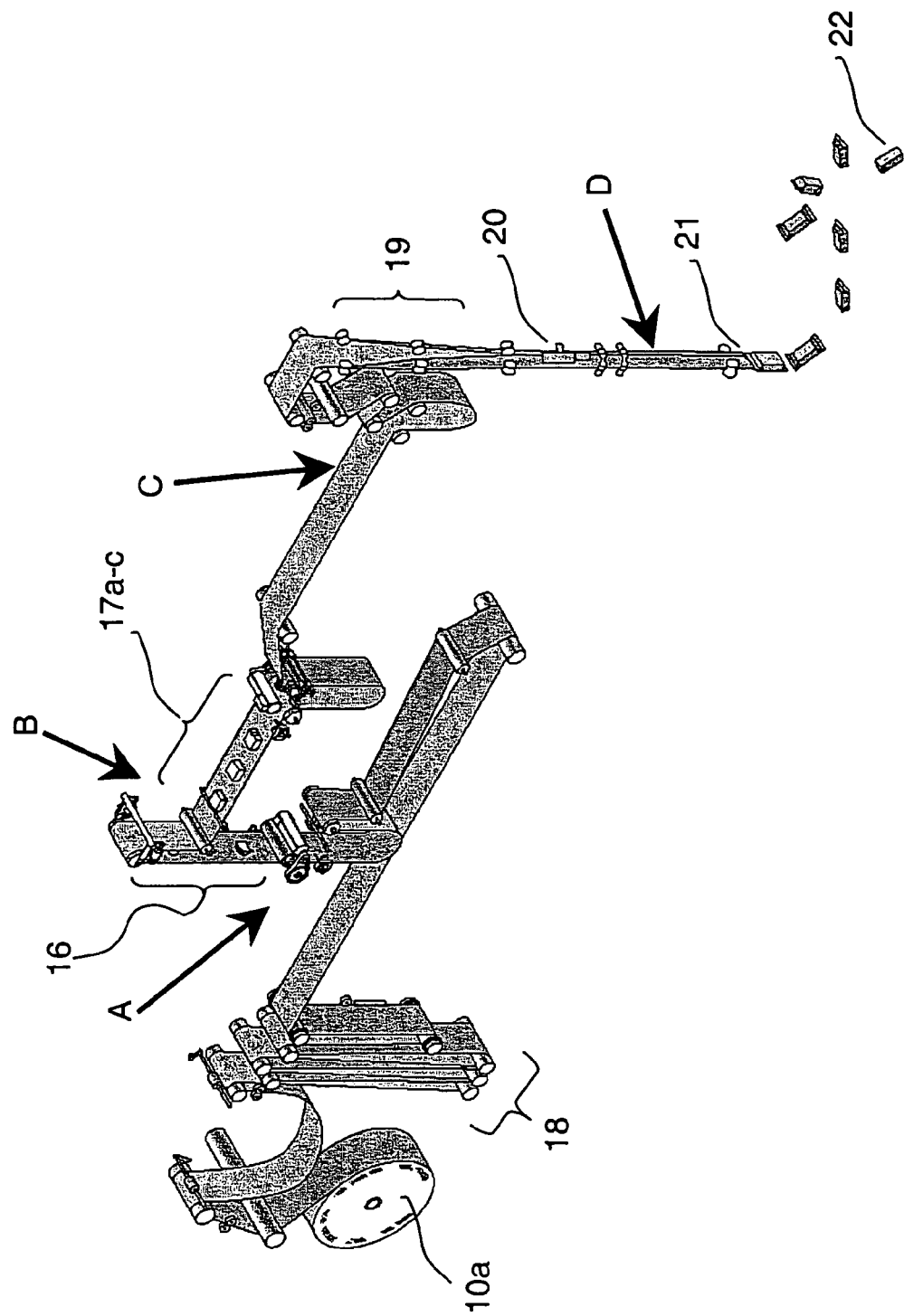

The present invention will now be described in greater detail hereinbelow, with reference to the accompanying schematic Drawings which, for purposes of exemplification, show currently preferred embodiments of the present invention according to its various aspects. In the accompanying Drawings:

FIG. 1 schematically illustrates equipment for conversion, printing of designer printed artwork and application of information to the packaging material;

FIG. 2 schematically shows how a paper web may be led through a filling machine and different stations where the method according to the present invention for transferring information may advantageously be employed; and FIGS. 3a-d schematically illustrate different variations of how the dots may be arranged so that they contain information.

DETAILED DESCRIPTION OF ONE PREFERRED EMBODIMENT

As will be apparent from FIG. 1, the paper web 1 is advanced in the conversion and printing plant between rollers 2 and guide rollers 3. FIG. 1 shows the portion where the paper web is provided with its designer printed artwork 4 and crease line pattern 5.

The designer printed artwork 4 is applied at a pair of rollers 6, 7 and is the printed artwork which covers the entire package and which is adapted so that the consumer will be able to identify the product, trademark, brand name, supplier etc. The formation of this printed artwork 4 is normally determined by the dairy owner or the retail chain. FIG. 1 shows but a single roller pair 6, 7, but in a conventional plant there are often between four and six different roller pairs 6, 7, one of the basic colours being applied at each respective roller pair. Moreover, there is most generally one roller pair which exclusively prints wholly black surfaced instead of mixing together the basic colours, and finally there is occasionally an extra roller pair for printing in a special colour which has been mixed beforehand. This last roller pair is employed above all if the dairy owner or the retail chain has a specifically trademark or brand name-linked colour which must always have exactly the right shade and which, moreover, covers large areas of the package.

The crease line pattern 5 is applied to the packaging web 1 by means of a creasing roller 8 and a counter roller (not shown). The creasing roller 8 has, on its circumferential surface, a crease line pattern in the form of elevations 9 or depressions which are repeated around its circumference. The counter roller may be smooth, with a resiliently yieldable surface of rubber or the like or it may be designed with depressions or elevations corresponding to those on the creasing roller so that elevations on the creasing roller may be accommodated in the depressions on the counter roller. Those portions of the paper web 1 which are clamped between the elevations 9 on the creasing roller 8 and the counter roller will be compressed and deformed so that the paper web 1 has, at these portions, less rigidity than remaining portions of the paper web 1. In this manner, the paper web 1 is provided with a pattern along which it will preferably bend on the forming of the package.

As is apparent from FIG. 1, conversion and printing plants generally handle paper webs 1 which comprise a number of paper webs 10a-c in side by side relationship. FIG. 2 shows how such a web 10a is led through a filling machine so as to form a number of packages. FIG. 1 schematically shows a paper web 1 which consists of three packaging webs 10a-c, but the number of packaging webs 10a-c in side by side relationship may naturally be varied according to need and machine capacity. After the conversion and printing process, the paper web 1 is cut into individual packaging webs 10a, 10b and 10c which are rolled up on separate reels (like the rolled up packaging web 10a in FIG. 2).

As will further be apparent from FIG. 1, the crease line pattern 5 will be placed on the packaging web 1 in relation to the design printed artwork 4 in accordance with the tolerances on level of freedom which exist in the tensioning of the machine and the paper web. In the next step, a guide mark 11 is written/printed which is partly intended to be used to activate/guide certain measures in the filling machine and which moreover is intended to carry information concerning the guide mark per se. A detector 12 reads-off the position between the crease line pattern 5c and the guide mark 11c, as well as possibly also the distance between the guide mark 11c and the design printed artwork 4c. Naturally, it is also conceivable to measure the distance between the design printed artwork 4 and the crease line pattern 5. In practice, it is this latter distance which is the critical one for the appearance of the package, but in order to handle the guiding of the filling machine, a guide mark 11 has, as was mentioned above, been entered which is easier for the filling machine to read-off. The term distance is taken to signify the absolute distance between a defined point on the guide mark 11 and a defined point on the crease line pattern 5 and/or some form of deviation dimension in relation a nominal position in relation to, for example, the detector 12. The position of the guide mark 11 and the crease line pattern 5 may be measured simultaneously by two detectors 12a-b, as shown in FIG. 1, but may also be measured in sequence after one another by means of one detector. If measurement is carried out in sequence, the speed and tension of the paper web must be accurately known, with the result that a new degree of freedom is introduced which must be given tolerances. At the time of writing, it is deemed most simple and most reliable to employ two detectors 12a-b which simultaneously measure the position of the guide mark 11c and the crease line pattern 5c.

Figure 3A:
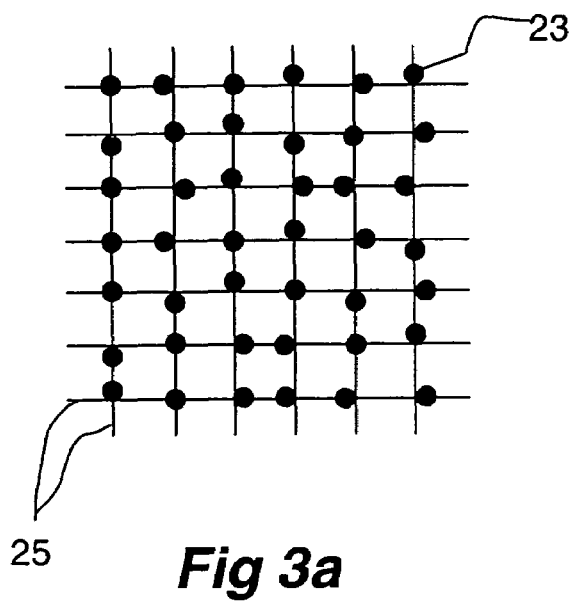
Figure 3B:
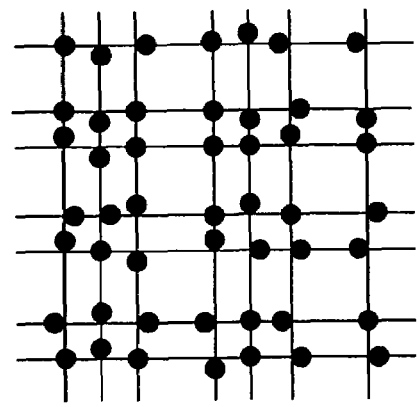
Figure 3C:
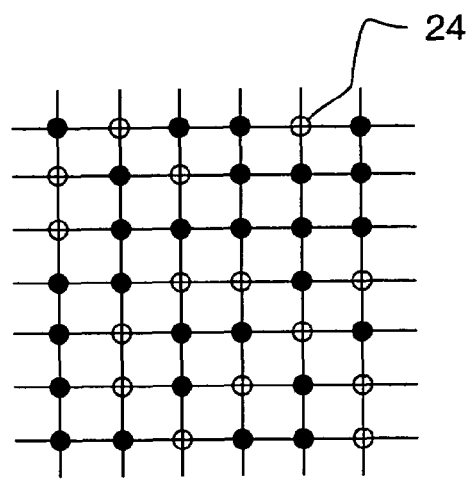
Figure 3D:
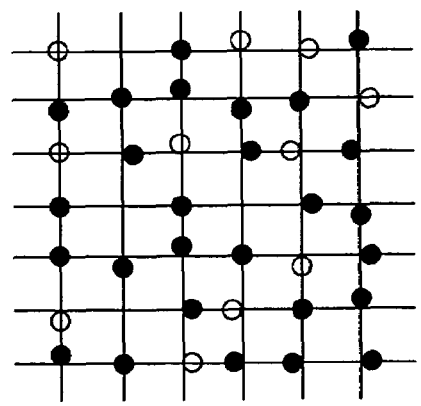

The signal which is transmitted from the detector 12 is processed and recycled 14 to the printer 13 which applies the guide mark 11 on the paper web 1. The guide mark 11 is printed, written or otherwise applied with the aid of a printer 13 or the like. The guide mark 11 contains a quantity of information which is described by of pattern of dots 23, rings 24 or the like. Of these dots, a number are offset in relation to a nominal dot position 25. This offsetting of the dots is made according to a specific system entailing that if a given number of dots is detected and positionally determined in relation to their nominal positions, that information which is then obtained may be interpreted as a specific distance or the like. The quantity of information may also be interpreted as a specific place on a considerably larger imaginary map, where every place has a unique set of positionally offset dots. The detected, unique place can be transmitted to an information processing unit which returns a response containing information which is linked to this unique position. Advantageously, the nominal dot position is a symmetrically repeating position (see FIG. 3a). For example, the nominal position for each respective dot may be located in the intersections of a right-angled grid network of geometric, straight lines 25 placed at uniformly spaced apart relationship. Alternatively, it is conceivable to employ some form of bar code where the lines lie at different mutual spacing (see FIG. 3b), as in a traditional bar code, and that the pattern of dots is offset in relation to nominal positions on this bar code. According to yet a further alternative, use is made of dots which have two different appearances (dot/circle) to create a pattern (see FIG. 3c) and in FIG. 3d it is shown how these different alternatives could be combined. FIG. 3d also shows how information may be generated in that certain dots are completely absent.

By measuring the positions of the guide mark 11, the crease line pattern 5 and the design printed artwork 4 on a portion 15c of the packaging web 1 which is already treated, but which is located a close distance from the portion 15a which is to be provided with a guide mark 11, it is possible to transfer information to the guide mark 11 which contains information about the positioning of the guide mark 11 per se. This can be put into effect in the knowledge that, in a conversion and printing plant, changes take place extremely slowly thanks to the large mass inertia which is inherent in the system. Thus, a portion 15a contains in actual fact information as to what has been measured at a previously treated, proximal portion 15c. FIG. 1 shows schematically how there is a portion 15b between said informationally interconnected portions 15a, 15c. Naturally, it is conceivable that there is no portion between them or that there are additional portions between them, according to needs and wishes. A short distance places high demands on the information processing speed of the detector 12 and the printer 13, while a long distance increases the possible fault change in the process as such.

The guide mark 11 is applied on the packaging web 1 by means of a colour which reflects the light according to a given colour spectrum. By selecting this guide mark colour in a suitable manner in relation to the colour selected for the design printed artwork 4, it is possible to print both of these patterns on one another without the consumer perceiving the dot pattern of the guide mark 11 and it nevertheless possible, using a wavelength-sensitive detector 12, to detect the dot pattern 11 without the detector 12 being disrupted by the design printed artwork 4. By such means, it is possible to employ in principle the whole of the surface area of the package so as to function as an information vehicle.

The printing plant is equipped with a number of detectors 12 and printers 13 so that there is one set for each package web 10a-c. For purposes of clarity, the equipment has been shown for the packaging web 10a and reference has been made to printing, crease lines and guide mark for the packaging web 10c. However, the intention is that each one of the packaging webs 10a, 10b, 10c be handled individually. However, it is possible to consider some form of cross-connection between the equipment 12, 13, 14 for each of the packaging webs 10a-c so as to increase reliability for error measurements. By such means, it is possible to increase reliability by, for example, specially handling a measurement which is deemed to lie within the tolerance limits but which greatly deviates from corresponding measurements on the other packaging webs.

WO 01/48591A1 describes a relatively recent developed variation according to which a specific pattern is created which is printed on the paper and which is read-off by a camera disposed on the pen. This publication describes that the pattern may be varied to such an extent that the imaginary surface area has a size of 4,600,000 square kilometres, in order words a size which is approximately half as large as Europe. Parts of this imaginary surface are printed on paper and linked either to a unique function or pure text recognition. For example, it is possible to print notepads adapted for writing fax messages or e-mail messages. The notepad is then designed so that each page has a portion where the text is to be written, a portion where the e-mail address is to be written and a symbol which gives the signal that the e-mail message is to be sent. The information which is read by the pen is sent, for example, via the mobile telephone network to a server which reads-off the place on the imaginary surface and then executes that function which corresponds to this specific place. For this technology to function as intended, it is thus required that the specially created substrate is adapted to the application which the user intends to employ. For a technical description of the technology for forming and reading the dot pattern, a person skilled in the art is referred to WO 01/48591A1. A person skilled in the art is also referred to this publication for an in-depth understanding of how information is intended to be transmitted from the pen to a server and thence further to, for example, the dairy owner offering the consumer a special service. An example of such a service could be participating in a competition or receiving more information about the product which is packed in the package.

FIG. 2 schematically shows how a package may be produced from a reel of the packaging material. First, the web is unwound from the reel and drawn reciprocally between a number of rollers in a material buffer station 18. By moving the rollers towards and away from one another, it is possible to adjust how long a paper web is accommodated in this station and it is thereby possible to adjust so as to unroll the web at an even rate even if the machine does not operate perfectly evenly. The machine illustrated in FIG. 2 then punches three holes along a portion 16 of the material web 10a, whereafter three opening arrangements 17a-c are injection moulded immediately over the three holes at another portion 17 of the web. Once the opening arrangements have been injection moulded on the paper web 10a, this may be drawn through an aseptic system for sterilising the web 10a. Any optional sterilisation system may be employed, of which the commonest is peroxide sterilisation in that the web 10a is led down through a peroxide bath. Thereafter, the planar paper web 10a begins to be formed into a tube in that the longitudinal edges under a portion 19 in the direction of travel of the paper web are brought towards one another and are finally fused together in that the outer layer plastic is temporarily heated up, for example, by hot air or induction heating 20. The tube is filled from above with the product intended for the package, such as milk, juice or the like. The elongate tube is then divided into individual packages in that the elongate tube is sealed together in transverse seals 21 along which the tube is cut to form individual packages which are finally formed into brick-shaped packages 22 in that the corner flaps are folded in towards the sides of the brick.

FIG. 2 shows with arrows four different positions A, B, C and D where it is possible to read-off/utilise information on the packaging material. At position A, it could be possible to employ the information for detecting the correct position to punch holes in the packaging material. At position B, corresponding information may be employed for ensuring correct positioning of the opening arrangements. At position C, the information may be employed for correcting settings for the sterilisation bath, for applying any possible longitudinal joint strips, as well as for setting the welding parameters for the longitudinal joints. In position D, the information may be employed for setting the correct welding and cutting parameters for the transverse sealing and cutting operations. Examples of information which may be applied on the packaging web are information about the thickness of the individual layers and the materials included.

A person skilled in the art will readily perceive that numerous modifications of the embodiments of the present invention described herein are possible without departing from the scope of the invention as this is defined in the appended Claims.

For example, other materials than the above described paper-based material may be conceivable, such as, for example, different types of plastic-based packaging materials. Further, use may be made of different types of barrier layers, such as, for example aluminium, SiOx, EVOH, etc.

The printer may, for example, be replaced by a laser or the like which activates certain points in a specific layer by heat or light treatment, or creates a depression or the like which alters the properties of the material as well as its reflection.

Further, the above-mentioned geometric figures/shapes may be bars, circles, rectangles, rhombs etc. which, moreover, in their own orientation may contain information.

The term wavelength range is taken to signify narrow ranges which may lie within one and the same colour, in other words the dot pattern may be printed with a blue colour and the design printed artwork may be printed with another blue colour, in which event these colours may be so alike that the consumer does not perceive the dotted pattern but only sees the design printed artwork, at the same time as a specific sensor with a well defined wavelength range only perceives the dot pattern.

What is claimed is:

1. A method of transferring information from a plant for the production of packaging material to a filling machine, comprising:
    producing a web of packaging material,
    measuring, on the production of the web, a predetermined magnitude in a first portion of the web, said portion being intended to form a first package in a filling machine,
    providing, on the production of the web, a second portion which is intended to form a second package in a filling machine, with information as to said measured magnitude,
    reading said information in a filling machine, and
    controlling a second predetermined magnitude in the filling machine on the basis of said information.

2. The method as claimed in claim 1, which further comprises providing said second portion with said information by applying a pattern of dots in which a number of the dots are offset in relation to a nominal dot position and/or that a number of the dots have a first configuration and a number of the dots have a second configuration or are absent.

3. The method as claimed in claim 2, which further comprises giving said dots a colour within a wavelength range which differs from the colours from which the pattern of the package are printed, so that the dots may be observed by a wavelength-defined sensor.

4. The method as claimed in claim 2, which further comprises giving said dots at least two different sizes/shapes for representation of a zero and a one respectively, in a binary information quantity.

5. A method of providing a packaging material with information from a plant for the production of packaging material, comprising:
    producing a web of packaging material,
    measuring, on the production of the web, a predetermined magnitude in a first portion of the web, said portion being intended to form a first package,
    providing, on the production of the web, a second portion which is intended to form a second package, with information as to said measured magnitude.

6. Web shaped packaging material which, along its longitudinal direction, comprises a substantially repetitive pattern of portions located after one another in the longitudinal direction and each one being intended to be formed into a package, wherein a first of said portions (15a) is provided with information regarding a measured magnitude in a second of said portions separate and discrete from the first.

7. The packaging material as claimed in claim 6, in which the first and the second portions follow immediately after one another along the web.

8. The packaging material as claimed in claim 6, wherein the first and the second portions are separated from one another by a number of portions which are each intended to be formed into packages.

9. The packaging material as claimed in claim 6, wherein said information comprises a pattern of dots in which a number of the dots are offset in relation to a nominal dot position and/or a number of the dots have a first configuration and a number of the dots have a second configuration or are absent.

10. The packaging material as claimed in claim 6, wherein said dots display a colour within a wavelength range which differs from those colours from which the pattern of the package are printed, so that the dots may be observed by a wavelength-defined sensor.

11. The packaging material as claimed in claim 6, wherein said dots have at least two different sizes/configurations for representation of a zero and a one, respectively, in a binary information quantity.

* * * * *